United States Patent
Shiragaki

(10) Patent No.: US 7,515,545 B2
(45) Date of Patent: Apr. 7, 2009

(54) SIGNAL REPEATER AND SWITCHING DEVICE, METHOD OF DETECTING CONNECTING RELATION BETWEEN SIGNAL REPEATER AND SWITCHING DEVICE AND COMMUNICATION SYSTEM

(75) Inventor: Tatsuya Shiragaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 958 days.

(21) Appl. No.: 10/869,078

(22) Filed: Jun. 17, 2004

(65) Prior Publication Data

US 2005/0002386 A1 Jan. 6, 2005

(30) Foreign Application Priority Data

Jun. 18, 2003 (JP) ............................. 2003-173298

(51) Int. Cl.
*H04J 1/16* (2006.01)
(52) U.S. Cl. ...................................... 370/248; 370/249
(58) Field of Classification Search ................. 370/248, 370/249
See application file for complete search history.

(56) References Cited

U.S. PATENT DOCUMENTS

| | | | | |
|---|---|---|---|---|
| 5,872,770 | A * | 2/1999 | Park et al. | 370/241.1 |
| 6,404,740 | B1 * | 6/2002 | Yoshida | 370/241.1 |
| 6,937,594 | B2 * | 8/2005 | Smith et al. | 370/352 |
| 2002/0031092 | A1 * | 3/2002 | Wakabayashi et al. | 370/249 |
| 2002/0044314 | A1 * | 4/2002 | Michishita | 359/110 |
| 2002/0061058 | A1 * | 5/2002 | Sommer | 375/213 |
| 2002/0159393 | A1 * | 10/2002 | Smith et al. | 370/249 |
| 2003/0206687 | A1 * | 11/2003 | Pfeiffer et al. | 385/22 |
| 2004/0250187 | A1 * | 12/2004 | Schauer et al. | 714/728 |
| 2005/0083835 | A1 * | 4/2005 | Prairie et al. | 370/224 |

FOREIGN PATENT DOCUMENTS

| | | |
|---|---|---|
| JP | 60-41828 A | 3/1985 |
| JP | 62-268245 A | 11/1987 |
| JP | 62-274858 A | 11/1987 |
| JP | 63-59126 A | 3/1988 |
| JP | 05-207528 A | 8/1993 |
| JP | 2001-223728 A | 8/2001 |
| JP | 2002-016699 A | 1/2002 |
| JP | 2003-526972 A | 9/2003 |

* cited by examiner

*Primary Examiner*—Andrew Lee
(74) *Attorney, Agent, or Firm*—Sughrue Mion, PLLC

(57) ABSTRACT

The present invention is intended to find a connecting state of a bidirectional signal repeater with an optical switch to prevent an erroneous registration of the topology. The present invention also has an object to confirm the normality of a link between the optical switch and bidirectional signal repeater even when no main signal is flowing by directing a signal from the bidirectional signal repeater to the optical switch. An identifier is added to the signal. One bidirectional port pair of the optical switch is set into a loop back configuration, without setting the remaining bidirectional port pairs into the loop back configuration. A controller checks whether or not a signal received by a regenerator is the same as a signal transmitted from a different regenerator. The normality of the link between the bidirectional signal repeater and optical switch is confirmed to evaluate the quality of a signal which returns from the bidirectional port pair which is in the loop back state.

10 Claims, 10 Drawing Sheets

SIGNAL REPEATER AND SWITCHING DEVICE, METHOD OF DETECTING CONNECTING RELATION BETWEEN SIGNAL REPEATER AND SWITCHING DEVICE AND COMMUNICATION SYSTEM

BACKGROUND OF THE INVENTION

1. Field of the Invention

The present invention relates to a method of detecting a connecting relation between a signal repeater and a switching device, and a communication system suitable for implementation of the detecting method.

2. Description of the Related Art

Networks have been configured using a method of switching time slots which are time-division-multiplexed on an optical signal, where an increased switching unit of a communication network associated with an increase in communication traffic results in requirements for a function of switching the unit of optical signals. This function is implemented using an optical cross-connect system (OXC) which is based on an optical switch.

FIG. 1 is a block diagram illustrating the configuration of an exemplary prior art optical cross-connect system. Here, a device which has a function of receiving a certain signal and delivering this signal after it has undergone processing is defined as a "signal repeater." Signal repeaters for transmitting signals in directions opposite to each other are collectively managed and are defined as a "bidirectional signal repeater." Also, when a bidirectional signal repeater repeats an optical signal, this repeater is called the "bidirectional optical signal repeater."

Referring to FIG. 1, optical fibers are connected to ports 1131, 1132, respectively, for connection with another node. Optical signal repeaters 1110, 1120 are collectively managed as a bidirectional optical signal repeater. Ports 1105, 1132 and 1107, 1134 are output ports of bidirectional optical signal repeaters 1110, 1120, respectively, while ports 1106, 1131 and 1108, 1133 are input ports of bidirectional optical signal repeaters 1110, 1120, respectively. An optical signal applied to port 1131 is delivered to port 1105; an optical signal applied to port 1106 is delivered to port 1132; an optical signal applied to port 1133 is delivered to port 1107; and an optical signal applied to port 1108 is delivered to port 1134. In the following, a pair of an input port and an output port which are connected to the same device is defined as a "bidirectional port pair". Ports 1105, 1106, and ports 1131, 132 are bidirectional port pairs, respectively. In FIG. 1, the bidirectional port pairs are designated by (1105, 1106) and (1132, 1132), respectively.

A bidirectional optical signal repeater comprises a 3R regenerative repeater (hereinafter called the "regenerator") and an optical fiber. Port 1131 and regenerator 1111 are interconnected through an optical fiber, while regenerator 1111 and port 1105 are also interconnected through an optical fiber. Likewise, port 1106 and regenerator 1112 are interconnected through an optical fiber, while regenerator 1112 and port 1132 are also interconnected through an optical fiber. Regenerator 1111 is located immediately before a transmitted optical signal is applied to optical switch 1100 because regenerator 1111 regenerates the optical signal into a waveform suitable for digital transmission. Also, regenerator 1112 is located immediately after the output of optical switch 1100 because an optical signal, which has passed through optical switch 1100, is regenerated by regenerator 1112 into a waveform suitable for transmission of digital signal. Assume now that SONET signals (see Bellcore document, GR-253-CORE, Issue 2, "Synchronous Optical Network (SONET) Transport Systems: Common Generic Criteria," published by Bellcore, 1995 for the format of the SONET signal) are used as a signal which is repeated with 3R regeneration, and as signals which are switched by optical switch 1100. In this scenario, a regenerator described in the foregoing Bellcore document may be used for purposes intended herein. Controller 1115 controls or manages regenerators 1111, 1112, while controller 1125 controls or manages regenerators 1121, 1122. Controllers 1115, 1125 have a function of reading/writing values from/into the overhead as a control/management function.

Optical switch 1100 comprises input ports 1101, 1103, 1142, and output ports 1102, 1104, 1141. Optical switch 1100 employed herein may be configured as shown in JP-5-207528-A by way of example.

FIG. 1 in JP-5-207528-A illustrates an optical switch which has input ports located on the left-hand side of the drawing, and output ports located on the right-hand side of the drawing. Likewise, in optical switch 1100, when the input ports and associated output ports are handled in combination, and those connected to optical signal repeaters are defined as bidirectional port pairs, the ports can be managed in units of bidirectional port pairs. In FIG. 1, ports 1101 and 1102, ports 1103 and 1104, and ports 1141 and 1142 form bidirectional port pairs, respectively. Controller 1109 is associated with optical switch 1100 for controlling the switching of optical switch 1100. Regenerators 1111, 1112, 1121, 1122 are connected to ports 1105, 1106, 1107, 1108 of optical switch 1100, respectively.

Some bidirectional optical repeater provides connections with another device in the same node in addition to the connection with optical fibers which constitute a transmission path. A router, represented by 1800, is connected to bidirectional optical repeater 1170, which comprises regenerators 1171, 1172, controller 1175, and ports 1173, 1174, 1181, 1182, through ports 1173, 1174. Other than this connection, bidirectional optical repeater 1170 is connected to optical switch 1100 through its ports 1181, 1182 and ports 1183, 1184 of optical switch 1100.

To build and manage a network, a network management system must be registered with information as to which bidirectional signal repeater is connected to ports of which optical switch, so that the network management system preserves the network topology.

Conventionally, however, manual operations have been relied on to confirm which bidirectional signal repeater is connected to a bidirectional port pair of which optical switch. Specifically, connected cables are visually traced for visual confirmation of their connections. For example, in the configuration illustrated in FIG. 1, automated confirmation cannot be made as to which port of optical switch 1100 is connected to which port of bidirectional signal repeater 1105, so that a human operator must trace connected cables to confirm which port is connected to which port.

When connections are visually confirmed to register the connectivity and network topology in the network management system, human errors, if any, would result in erroneous registration and possible network faults.

In particularly, when a network is re-started immediately after installation or replacement of a certain device, or due to a fault, the connecting relation must be registered again in the network management system, in which case the network topology can be erroneously registered due to a human error as mentioned above.

Also, an optical signal passes through an optical switch as it is, and, among bidirectional signal repeaters, assuming that there is spare bidirectional optical signal repeater 1120 to which spare optical fibers are connected, an optical signal can not be applied from port 1133, because repeater 1120 is reserved as a spare, resulting in no signal flowing through a link between port 1107 and port 1103. The absence of signal between port 1107 and port 1103 inhibits the operator from managing the presence or absence of a fault on the link between bidirectional optical signal repeater 1120 and optical switch 1100. Therefore, the main signal must be switched without confirming that the optical link has not failed. If the main signal is switched for using the link between bidirectional signal repeater 1120 and optical switch 1100 in spite of a fault thereon, a longer time will be taken to recover from the fault because of surplus switching which cannot be recovered even if the link is recovered from the fault.

SUMMARY OF THE INVENTION

The present invention has been made in view of the problems as mentioned above inherent in the prior art, and it is an object of the invention to provide a method of detecting a connecting relation between a signal repeater and a switching device, which is capable of finding a connecting state of a bidirectional signal repeater to a port of an optical switch to prevent an erroneous registration of the topology, and confirming the normality of a link between an optical switch and a bidirectional signal repeater to prevent meaningless switching in the event of a fault even in a situation where no main signal is flowing. The present invention also provides a communication system which is suitable for implementation of the foregoing method.

A communication system according to the present invention includes a switching device having a plurality of bidirectional port pairs, each of which is a combination of an input port and an output port, and being capable of entering a loop back state for delivering a signal applied to an input port to an output port which forms the bidirectional port pair together with the input port; a plurality of signal repeaters each having an input port and an output port for connection to an input port or an output port which forms part of one of the bidirectional port pairs; and a controller for controlling the switching device and the signal repeaters, wherein each signal repeater includes transmitting means for transmitting a signal from its output port to the switching device after the signal repeater has added an identifier to the signal, and receiving means for receiving a signal from the switching device at its reception port to detect an identifier included in the signal; and the controller sets one of the bidirectional port pairs included in the switching device into a loop back state, and checks whether the identifier added to the signal transmitted from the transmitting means matches the identifier included in the signal received by the receiving means to detect a connecting relation between the output port and input port of the signal repeater and the output port and input port which forms the bidirectional port pair.

In the foregoing communication system, the switching device may be an optical switch, and the signal may be an optical signal.

A method of detecting a connecting relation between a signal repeater and a switching device according to the present invention is executed in a communication system which has a switching device having a plurality of bidirectional port pairs, each of which is a combination of an input port and an output port, and being capable of entering a loop back state for delivering a signal applied to an input port to an output port which forms the bidirectional port pair together with the input port, and a plurality of signal repeaters each having an input port and an output port for connection to an input port or an output port which forms part of the bidirectional port pair. The method includes a first step of adding an identifier to a signal in one of the signal repeaters and transmitting the signal to the switching device, a second step of setting one of the bidirectional port pairs included in the switching device into a loop back state, and a third step of detecting an identifier received in the signal repeater, confirming whether or not the received identifier matches the identifier added to the signal transmitted at the first step, when confirming the matching of the identifiers, determining that the input port and output port of the signal repeater for which the matching has been confirmed are connected to the output port and input port of the bidirectional port pair set into the loop back state, and when not confirming the matching of the identifiers, setting a different bidirectional port pair into the loop back state at the second step to repeat a similar operation.

A method of detecting a connecting relation between a signal repeater and a switching device according to another aspect of the present invention is executed in a communication system which has a switching device having a plurality of bidirectional port pairs, each of which is a combination of an input port and an output port, and being capable of entering a loop back state for delivering a signal applied to an input port to the input port as well as to an output port which forms part of the bidirectional port pair, and a plurality of signal repeaters each having an input port and an output port for connection to an input port or an output port which forms part of the bidirectional port pair. The method includes a first step of adding an identifier to a signal in one of the signal repeaters and transmitting the signal to the switching device, a second step of setting one of the bidirectional port pairs included in the switching device into a loop back state, and a third step of detecting an identifier received in the signal repeater, confirming whether or not the received identifier matches the identifier added to the signal transmitted at the first step, when confirming the matching of the identifiers, determining that the input port and output port of the signal repeater for which the matching has been confirmed are connected to the output port and input port of the bidirectional port pair set into the loop back state, and when not confirming the matching of the identifiers, adding an identifier to a signal in a different one of the signal repeaters at the first step to repeat a similar operation.

A communication system according to another aspect of the present invention includes a switching device having a plurality of bidirectional port pairs, each of which is a combination of an input port and an output port, and being capable of entering a loop back state for delivering a signal applied to an output port which forms the bidirectional port pair together with the input port; a plurality of signal repeaters each having an input port and an output port for connection to an input port or an output port which forms part of the bidirectional port pair; and a controller for controlling the switching device and the signal repeaters, wherein each the signal repeater includes transmitting means for transmitting a signal from its output port to the switching device after the signal repeater has added information for measuring a signal quality, and reception quality measuring means for measuring the quality of the received signal with the signal looped back from the switching means and having the information for measuring the signal quality added thereto, and the controller sets one of the bidirectional port pairs included in the switching device into a loop back state, and forces the transmitting means and the reception quality measuring means to measure the quality of the received signal.

In the foregoing communication system, the controller may rely on the quality of the received signal to confirm the normality in a connecting relation between the output port and input port of the signal repeater and the output port and input port which form the bidirectional port pair.

A method of detecting a connecting relation between a signal repeater and a switching device according to another aspect of the present invention is executed in a communication system which has a switching device having a plurality of bidirectional port pairs, each of which is a combination of an input port and an output port, and being capable of entering a loop back state for delivering a signal applied to an input port to an output port which forms the bidirectional port pair together with the input port, and a plurality of signal repeaters each having an input port and an output port for connection to an input port or an output port which forms part of the bidirectional port pair. The method includes a first step of adding an identifier to a signal in one of the signal repeaters and transmitting the signal to the switching device, a second step of setting one of the bidirectional port pairs included in the switching device into a loop back state, a third step of detecting an identifier received in the signal repeater, confirming whether or not the received identifier matches the identifier added to the signal transmitted at the first step, and when confirming the matching of the identifiers, determining that the input port and output port of the signal repeater for which the matching has been confirmed are connected to the output port and input port of the bidirectional port pair set into the loop back state, and a fourth step, executed when not confirming the matching of the identifiers, for confirming whether or not an identifier has been received by a signal repeater other than the signal repeater which has transmitted the identifier at the first step, recognizing that there is an error in a connection between the signal repeater and the switching device when confirming that an identifier has been received by a signal repeater other than the signal repeater which has transmitted the identifier, and setting a different bidirectional port pair into the loop back state at the second step to repeat a similar operation when confirming that no identifier has been received by a signal repeater other than the signal repeater which has transmitted the identifier.

A method of detecting a connecting relation between a signal repeater and a switching device according to another aspect of the present invention is executed in a communication system which has a switching device having a plurality of bidirectional port pairs, each of which is a combination of an input port and an output port, and being capable of entering a loop back state for delivering a signal applied to an input port to an output port which forms the bidirectional port pair together with the input port, and a plurality of signal repeaters each having an input port and an output port for connection to an input port or an output port which forms part of the bidirectional port pair. The method includes a first step of adding an identifier to a signal in one of the signal repeaters and transmitting the signal to the switching device, a second step of setting one of the bidirectional port pairs included in the switching device into a loop back state, a third step of detecting an identifier received in the signal repeater, confirming whether or not the received identifier matches the identifier added to the signal transmitted at the first step, and when confirming the matching of the identifiers, determining that the input port and output port of the signal repeater for which the matching has been confirmed are connected to the output port and input port of the bidirectional port pair set into the loop back state, and a fourth step, executed when not confirming the matching of the identifiers, for confirming whether or not an identifier has been received by a signal repeater other than the signal repeater which has transmitted the identifier at the first step, recognizing that there is an error in a connection between the signal repeater and the switching device when confirming that an identifier has been received by a signal repeater other than the signal repeater which has transmitted the identifier, and adding an identifier to a signal in a different one of the signal repeaters at the first step to repeat a similar operation when confirming that no identifier has been received by a signal repeater other than the signal repeater which has transmitted the identifier.

In the following, the action of the present invention will be described. A switch is defined as being in a "loop back state" when the switch is switched to enter a state in which a signal applied to an input port of a bidirectional port pair of the switch returns to an output port which forms part of the bidirectional port pair, and is delivered therefrom.

A signal is sent to a switching device from a regenerator (transmitting means) within a bidirectional signal repeater for which a connecting relation is to be detected. An identifier is added to the sent signal. One bidirectional port pair alone is set into the loop back state, without setting the remaining bidirectional port pairs into the loop back state. When only one bidirectional port pair of the switching device is set into the loop back state within the switching device, the bidirectional signal repeater, which is sending a signal to the switching device and is simultaneously receiving a signal, receives the same signal as that sent when it is connected to the bidirectional port pair of the switching device which is in the loop back state. Therefore, when looking to a certain bidirectional signal repeater to find a bidirectional port pair connected thereto, bidirectional port pairs of the optical switch are set into the loop back state from one to another in sequence, and a check is made as to whether or not the associated bidirectional signal repeater can receive the same signal as that transmitted each time a different pair is set into the loop back state, thereby finding which bidirectional port pair of the optical switch is connected to the bidirectional signal repeater. When the bidirectional signal repeater receives the same signal, the bidirectional signal repeater is connected to the bidirectional port pair of the switching device which is in the loop back state. For checking whether or not a bidirectional signal repeater is receiving the same signal as that transmitted thereby, an identifier may be added to the signal, and a check may be made as to whether or not the bidirectional signal repeater receives the same identifier as that added to the signal thereby.

In the foregoing example, a port for transmission from and a port for reception at the bidirectional signal repeater are fixed, while bidirectional port pairs of the optical switch are set into the loop back state from one to another in sequence to find a bidirectional port pair of the switching device through which a signal transmitted by the bidirectional signal repeater returns thereto. Conversely, a certain bidirectional port pair of the switching device may be fixed in the loop back configuration, while the bidirectional signal repeater may transmit a signal to which an identifier has been added. A connecting relation between the bidirectional signal repeater and optical switch can be found by determining whether a received signal is the same as the transmitted signal.

Once the connecting relation is found, it is necessary to confirm the normality of a link which interconnects the bidirectional signal repeater and optical switch. For this purpose, the bidirectional port pair connected to the bidirectional signal repeater is switched into the loop back state, and the quality of a returning signal may be evaluated in the bidirectional signal repeater to confirm the normality of the link between the bidirectional signal repeater and optical switch.

DETAILED DESCRIPTION OF THE PREFERRED EMBODIMENTS

Next, embodiments of the present invention will be described with reference to the accompanying drawings.

Referring first to FIGS. 2 to 5, a first embodiment will be described.

Figure 1:
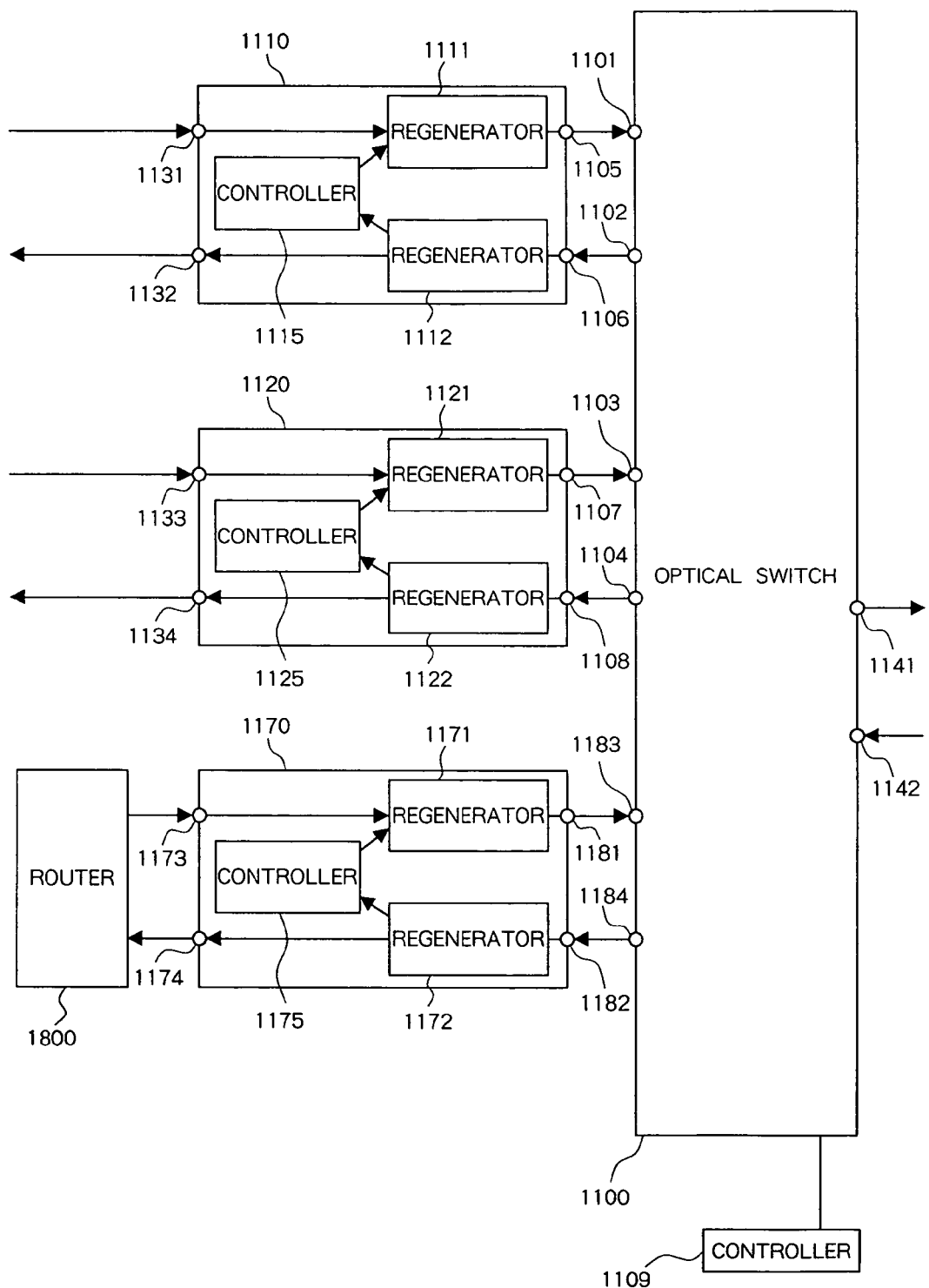
FIG. 1 is a diagram for describing a prior art example.
Figure 2:
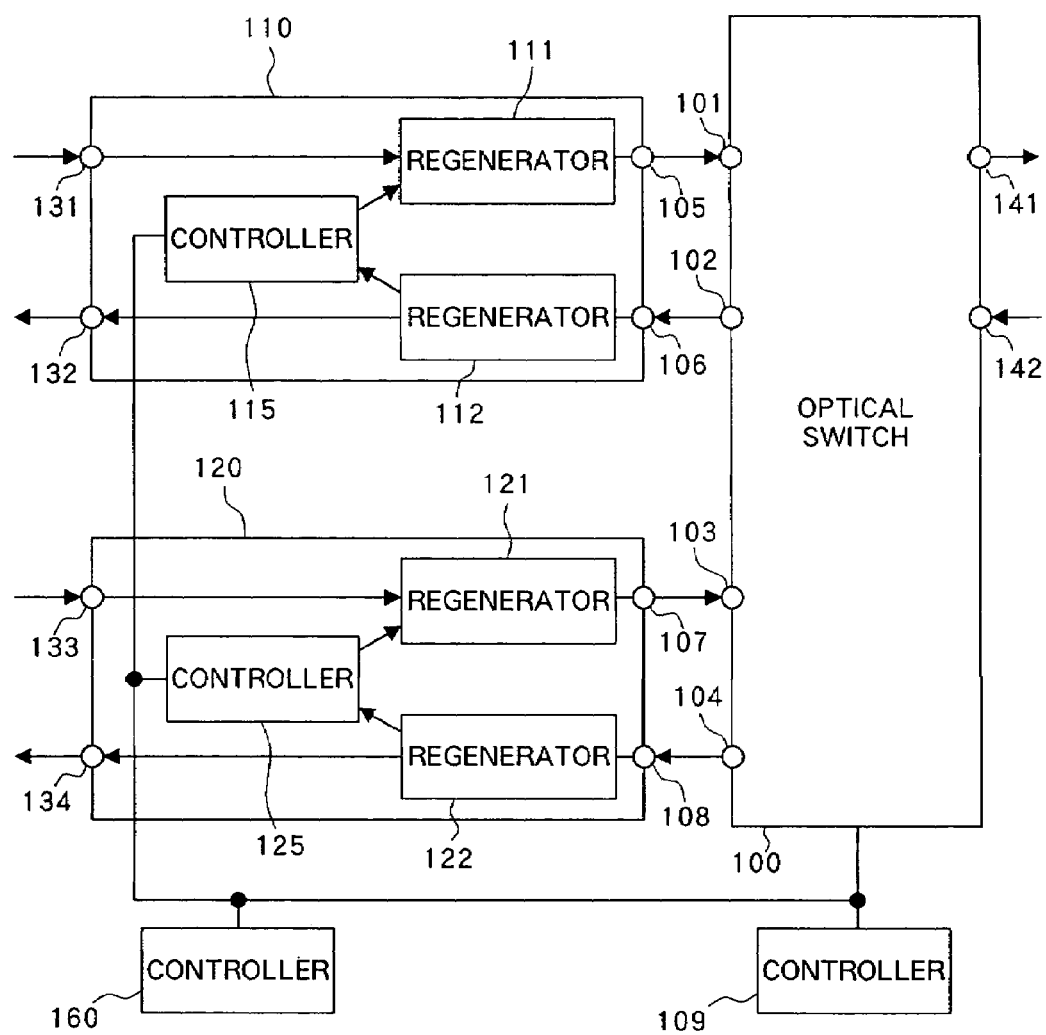
FIG. 2 is a block diagram illustrating the configuration of a communication system according to the first embodiment of the present invention.

In FIG. 2, ports 101-108, 131-134, 141, 142; regenerators 111, 112, 121, 122; controllers 115, 125; bidirectional optical signal repeaters 110, 120; optical switch 100, and controller 109 are each designed to operate in a similar manner to ports 1101-1108, 1131-1134, 1141, 1142; regenerators 1111, 1112, 1122; controllers 1115, 1125; bidirectional optical signal repeaters 1110, 1120; optical switch 1100; and controller 1109, respectively, shown in FIG. 1. In this embodiment, controller 160 is provided in addition to the foregoing components for connection with controllers 115, 125 of respective bidirectional optical signal repeaters 110, 120 as well as for connection with controller 109.

Described first will be basic operations for checking connecting relations of bidirectional optical signal repeaters 110, 120 with respective ports of optical switch 100 in this embodiment.

For checking the connecting relation between ports of bidirectional optical signal repeater 110 and ports of optical switch 100, optical switch 100 is applied to an optical signal to which an identifier has been added by regenerator 111. Optical switch 100 is switched such that one of the bidirectional port pairs is set into a loop back state (for delivering the optical signal applied to an input port of optical switch 100 to an output port of the same which forms a pair with the input port), with the remaining bidirectional port pairs being prevented from entering the loop back state within optical switch 100. In the example illustrated in FIG. 3, a bidirectional port pair comprised of ports 107, 108 of bidirectional optical signal repeater 120 is set into the loop back state, while in the example illustrated in FIG. 4, a bidirectional port pair comprised of ports 105, 106 of bidirectional optical signal repeater 110 is set into the loop back state.

When one bidirectional port pair of optical switch 100 is set into the loop back state, a bidirectional optical signal repeater comprising a bidirectional port pair connected to this bidirectional port pair receives the same signal as that delivered thereby. Therefore, when looking for a certain bidirectional optical signal repeater, bidirectional port pairs of optical switch 100 are set into the loop back state from one to another in order, and a check is made whether or not the bidirectional optical signal repeater can receive the same signal as that transmitted thereby each time a different pair is set into the loop back state, thereby finding which bidirectional port pair of optical switch 100 is connected to the bidirectional optical signal repeater.

For checking whether or not a bidirectional optical signal repeater is receiving the same signal as that sent to optical switch 100 therefrom, the signal may be appended with an identifier, such that a check is made as to whether or not the bidirectional optical signal repeater receives a signal including the same identifier. The identifier used herein may be a J0 byte which is included in the overhead of SONET. SONET stipulates that the J0 byte should be used as an identifier for 3R regenerative repeaters connected adjacent to each other.

Each of regenerators 111, 112, 121, 122, which conform to SONET, writes an identifier into the J0 byte, while controller 115 has the function of reading the identifier from the J0 byte. As described in Bellcore's reference (Bellcore document, GR-253-CORE, Issue 2, "Synchronous Optical Network (SONET) Transport Systems: Common Generic Criteria," published by Bellcore, 1995), this function can be implemented by extracting the clock in the SONET signal upon receipt thereof for frame synchronization, updating information stored in the J0 byte in the overhead, or recognizing the value of the J0 byte in the overhead bytes.

Controllers 115, 125, which control bidirectional optical signal repeaters 110, 120, respectively, pass values of identifiers to be written to regenerators 111, 121, and receive values of identifiers read from regenerators 112, 122. Controller 160, connected to controllers 115, 125, has a function of determining whether an identifier written by regenerator 111 matches an identifier received from regenerator 112, and whether an identifier written by regenerator 121 matches an identifier received from regenerator 122.

Controller 160 also manages read/write of an identifier from/into a signal which passes through a regenerator of a bidirectional optical signal repeater, as well as the order in which predetermined bidirectional port pairs of optical switch 100 are set into the loop back state. This is because a match or mismatch of a transmitted identifier with a received identifier must be confirmed after confirming with certainty that the control for setting a bidirectional port pair into the loop back state has been completed. The management of the sequence is a function essential for orderly performing the control operation without errors. Controller 160, controllers 115, 125 of regenerators 112, 122, and controller 109 which controls optical switch 100, are interconnected through LAN cables to build LAN, such that information can be exchanged among these respective controllers. Alternatively, controller 160 may be incorporated into any of the controllers 115, 125, 109.

Figure 3:
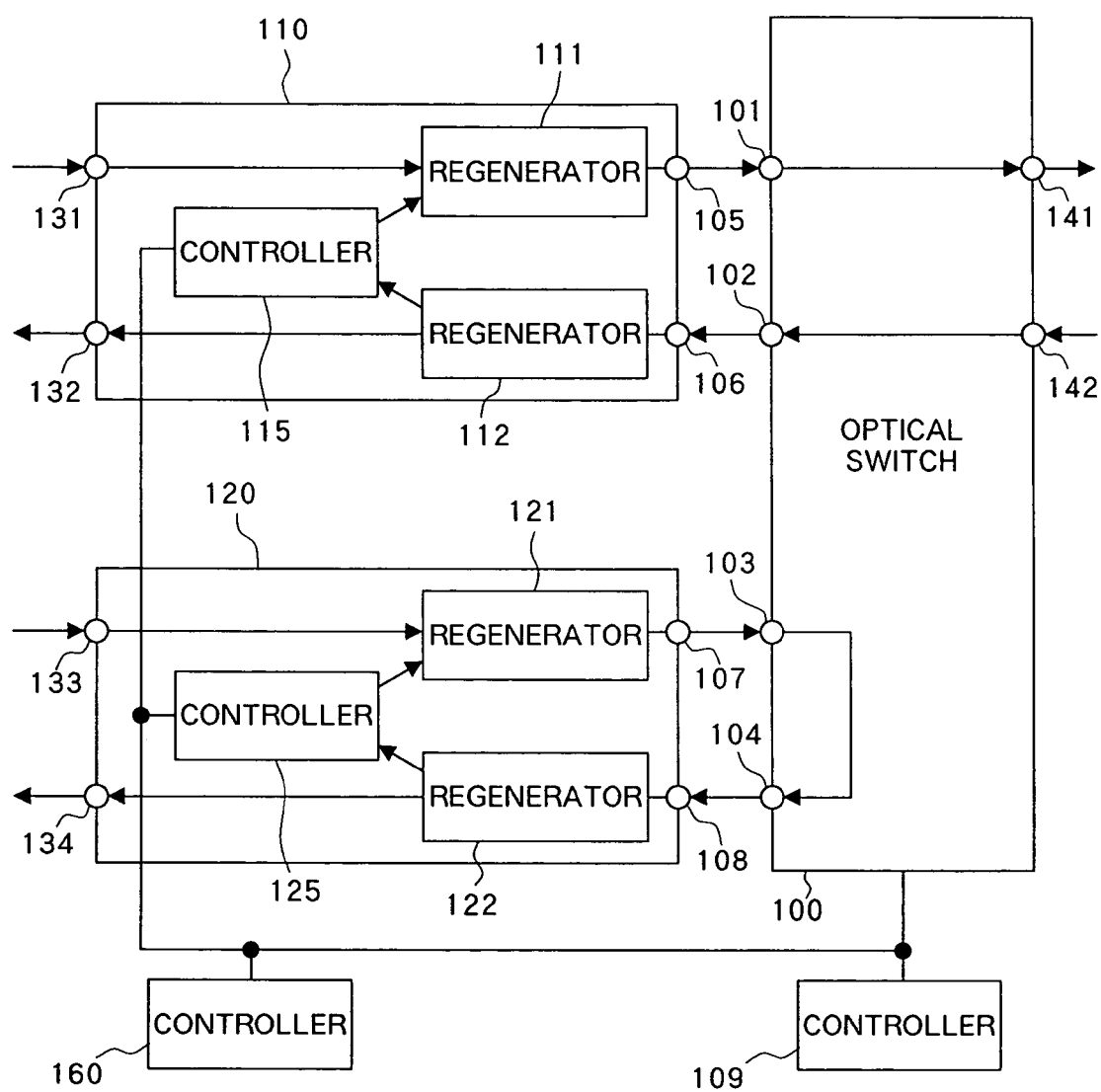
FIG. 3 is a block diagram illustrating the configuration of the communication system according to the first embodiment of the present invention, showing an optical switch in one connecting state.

In the state illustrated in FIG. 3, controller 160 sends to controller 109 a switching request for establishing the loop back state with a bidirectional port pair comprised of ports 103, 104 of optical switch 100. A signal provided by regenerator 112 of bidirectional optical signal repeater 110 is not a signal generated by regenerator 111, but is an optical signal applied from port 142. This can be confirmed from the fact that the optical signal applied to port 142 has an identifier different from an identifier added by regenerator 111. Specifically, a transmitted identifier added by regenerator 111 and held by controller 115, and an identifier included in a signal received by controller 115 from regenerator 112 are sent to controller 160 which then compares these identifiers for determine whether the signal generated by regenerator 111 or applied from port 142.

Figure 4:
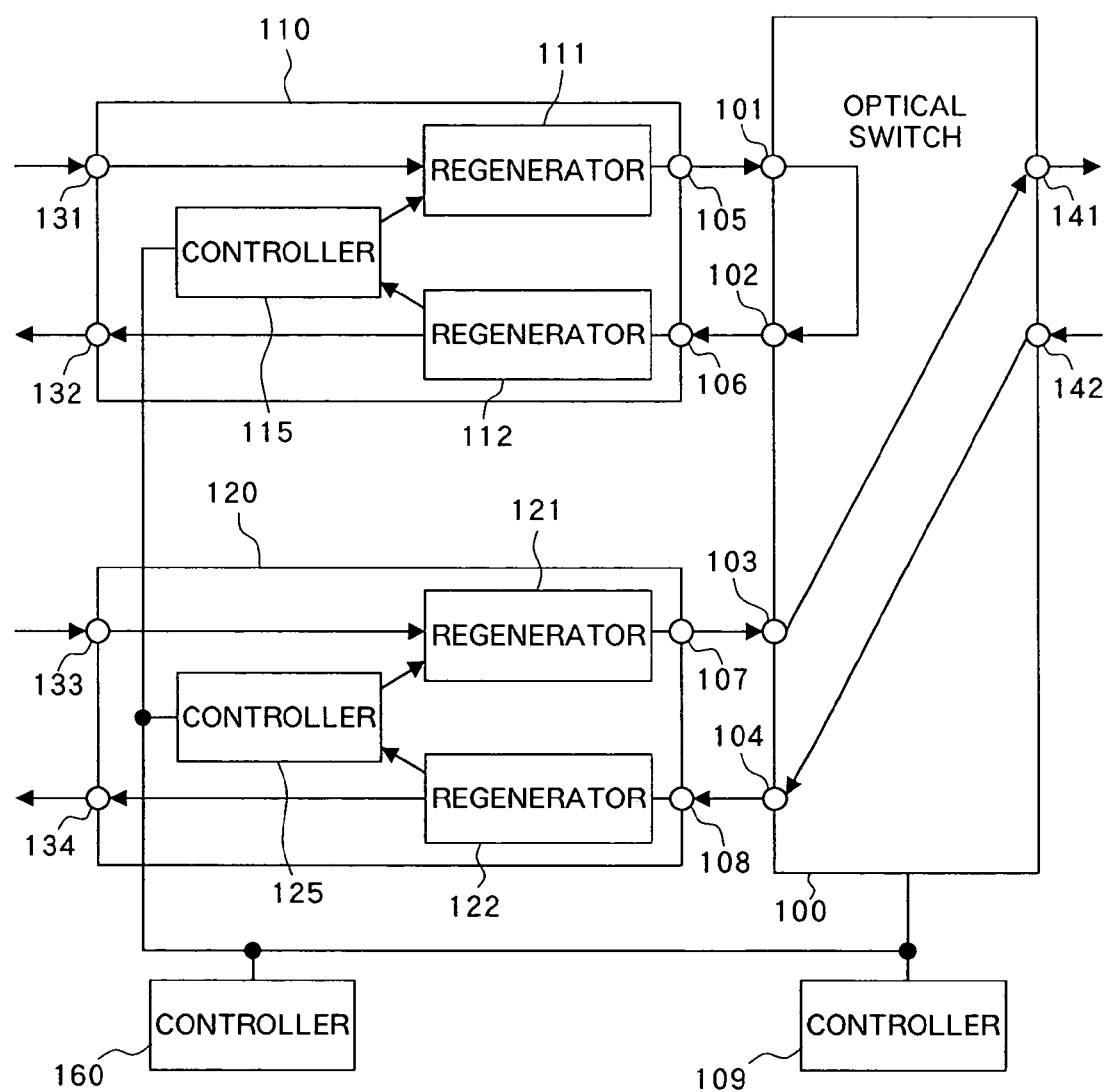
FIG. 4 is a block diagram illustrating the configuration of the communication system according to the first embodiment of the present invention, showing the optical switch in another connecting state.

On the other hand, in the state illustrated in FIG. 4, controller 160 sends to controller 109 a switching request for establishing the loop back state with a bidirectional port pair comprised of ports 101, 102 of optical switch 100. With the bidirectional port pair comprised of ports 101, 102 set into the loop back state, the same signal returns to bidirectional optical signal repeater 110. Therefore, a signal received by regenerator 112 in bidirectional optical signal repeater 110 is an optical signal delivered from regenerator 111. As such, an identifier added to the transmitted signal in regenerator 111 matches an identifier extracted from the optical signal received by regenerator 112. Specifically, a transmitted identifier added by regenerator 111 and held by controller 115, and an identifier included in the signal received by controller 115 from regenerator 112 are sent to controller 160 which then compares these identifiers for the determination.

After controller 160 can confirm the matching of the identifiers, numbers of ports 105, 106 forming a bidirectional port pair in bidirectional optical signal repeater 110, and numbers of ports 101, 102 forming a bidirectional port pair in optical switch 100 at that time are sent to controller 160, causing controller 160 to recognize that ports 105, 106 forming a bidirectional port pair in bidirectional optical signal repeater 110 are connected to ports 101, 102 forming a bidirectional port pair in optical switch 100, respectively.

Controller 160 recognizes, from notifications from controllers 115, 125 that ports 102, 105 among those ports forming the bidirectional port pairs are output ports, and ports 101, 106 are input ports, and knows from this recognition that port 105 is connected to port 101, while port 102 is connected to port 105.

In the manner described above, it is possible to find the connecting relation between the ports of bidirectional optical signal repeater 110 and the ports of optical switch 100.

The foregoing description has been made of the basic operations for checking a connecting relation between each port of the bidirectional optical signal repeater and each port of the optical switch in the first embodiment with reference to FIGS. 2 to 4.

Figure 5:
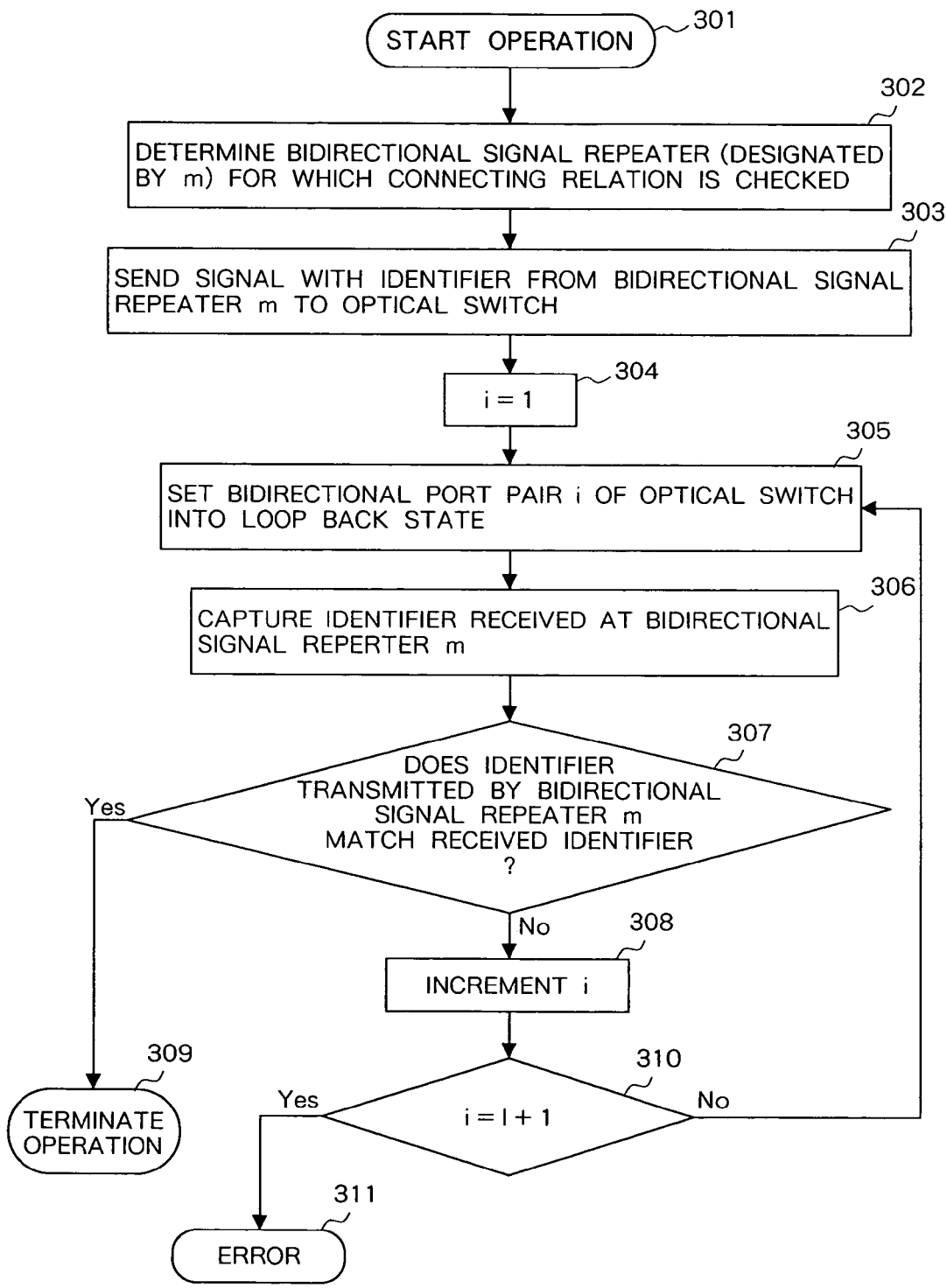
FIG. 5 is a flow chart illustrating a method for detecting a connecting relation between a signal repeater and an optical switch according to the first embodiment of the present invention.

FIG. 5 is a flow chart illustrating operations involved in the foregoing check when three or more bidirectional optical signal repeaters are designated as candidates for connection with optical switch 100. The operations will be described below with reference to FIG. 5 together with FIG. 4.

First, controller 160 determines a bidirectional optical signal repeater for which a check is made as to which ports of the optical switch the bidirectional optical signal repeater is connected to, and designates the determined bidirectional optical signal repeater by "m" (step 302). Assume now that bidirectional optical signal repeater "m" for which a connecting state is to be checked is determined to be bidirectional optical signal repeater 110 in FIG. 2, and the following will occur.

Controller 160 sets an identifier value to the JO byte in regenerator 111 of bidirectional optical signal repeater 110 through controller 115 (step 303). Next, controller 160 employs a variable "i" for indicating a number given to a bidirectional port pair of optical switch 100 which can be connected to the bidirectional optical signal repeater 110. when there are "l" candidate ports in optical switch 100, "i" is a natural number, and corresponds to one of "1 to l" to a port of optical switch 100. By varying the value of "i", controller 160 confirms a connection with the bidirectional optical signal repeater "m" to confirm the connectivity with all possible ports of optical switch 100 which can be connected to the bidirectional optical signal repeater "m".

Controller 160 first sets "1" to "i" (i=1) (step 304). Assume herein that a bidirectional port pair of optical switch 100 corresponding to i=1 is comprised of port 103, 104. Next, the bidirectional port pair comprised of ports 103, 104 of optical switch 100 corresponding to i=1 is set into a loop back state (step 305). Next, controller 160 detects an optical signal applied to reception port 106 of bidirectional optical signal repeater 110, which is the bidirectional optical signal repeater "m", through regenerator 112 and controller 115, and extracts an identifier from the optical signal (step 306). Controller 160 checks whether a transmitted identifier is the same as the received identifier (step 307).

When controller 160 confirms at step 307 that both identifiers match each other, controller 160 determines that the bidirectional optical signal repeater "m" is now connected to the bidirectional port pair of optical switch 100 which corresponds to current "i", followed by termination of the routine (step 309).

As in the example given above, when the loop back state is established with the bidirectional port pair comprised of ports 103, 104 of optical switch 100 corresponding to i=1, an optical signal having an identifier added thereto in regenerator 111 of bidirectional optical signal repeater 110 will not return to bidirectional optical signal repeater 110, as illustrated in FIG. 3, so that the identifier of the bidirectional optical signal repeater "m" does not match the received identifier. Consequently, controller 160 does not confirm at step 307 that the identifiers match each other, and knows that bidirectional optical signal repeater 110 is not connected to the bidirectional port pair comprised of ports 103, 104 of optical switch 100 corresponding to i=1, so that controller 160 recognizes the need for checking other ports of optical switch 100 which can be connected to the bidirectional optical signal repeater "m".

Thus, upon confirming that the identifiers do not match each other at step 307, controller 160 checks other ports of optical switch 100 which form a bidirectional port pair, by incrementing the value of "i" (step 308), confirming that i=l+1 will not happen (step 310), and returning to step 305. In this way, controller 160 starts a check as to whether or not a bidirectional port pair of optical switch 100 corresponding to i=2 is connected to bidirectional optical signal repeater 110.

If i=l+1 is confirmed at step 310, controller 160 performs error-related processing (step 311), followed by termination of the routine.

If the loop back state is established with certain bidirectional port pair i of optical switch 100 during repetitions of a loop formed of steps 305-310, the same signal as the transmitted one may return to bidirectional optical signal repeater 110 (when Yes at step 307). In this event, the communication system is in the state as illustrated in FIG. 4. In FIG. 4, a bidirectional port pair of optical switch 100 indicated by the number "i" is comprised of ports 101, 102 which are in the loop back state. When ports of a bidirectional optical signal repeater are connected to ports of an optical switch, the bidirectional optical signal repeater receives the same signal as that sent to the optical switch therefrom only when the ports of the optical switch are in the loop back state, thus permitting controller 160 to know that bidirectional optical signal repeater "m" is connected to bidirectional port pair "i" of the optical switch.

When no solution can be found even after the bidirectional optical signal repeater has been checked for all bidirectional port pairs i (when Yes at step 310), an error occurs (step 311), causing controller 160 to check other possible faults.

Figure 6:
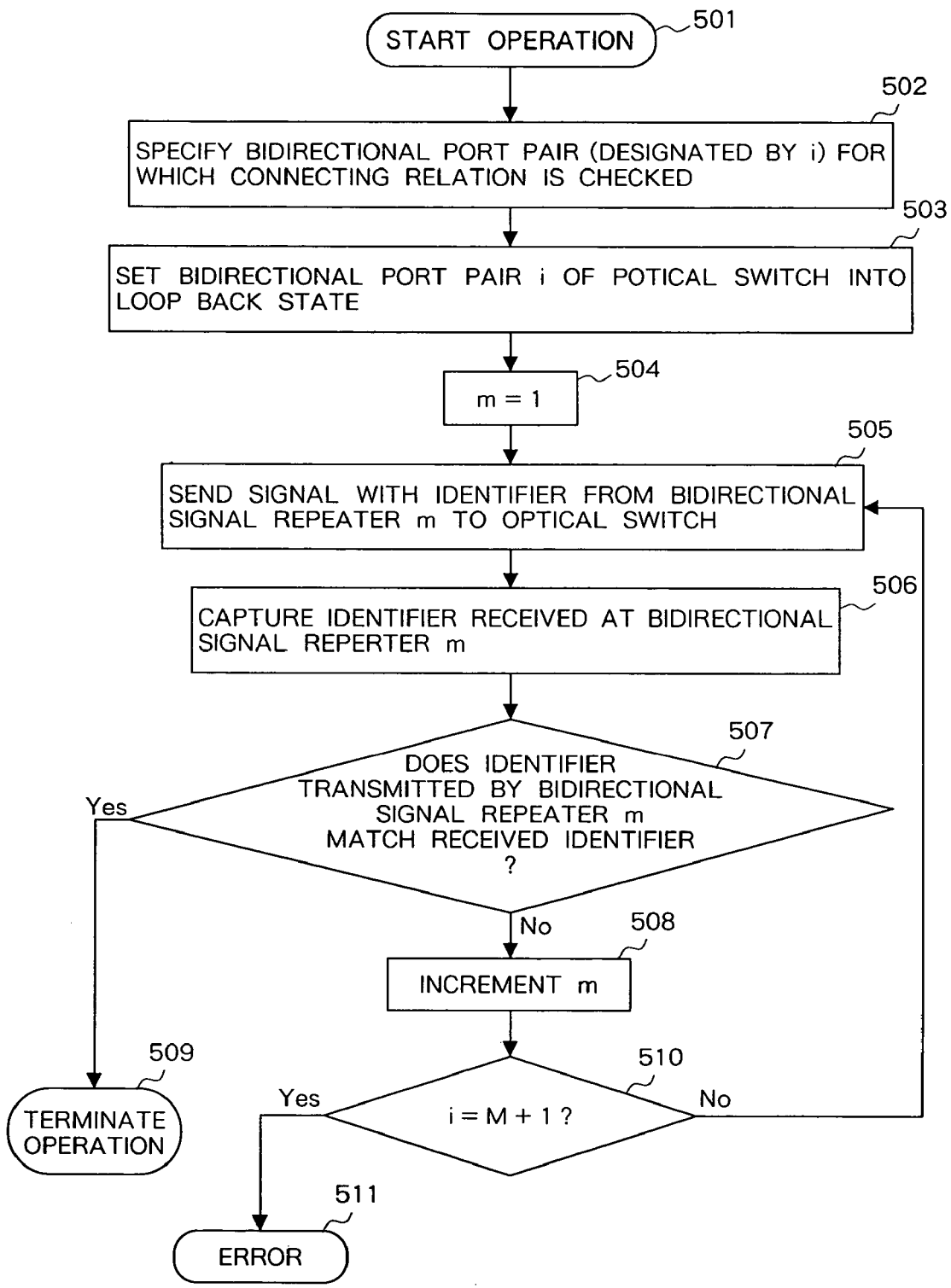
FIG. 6 is a flow chart illustrating the method for detecting a connecting state according to a second embodiment of the present invention.

Next, a second embodiment of the present invention will be described with reference to the flow chart of FIG. 6 which illustrates a routine according to the second embodiment.

In the flow chart illustrated in FIG. 5, a single bidirectional optical signal repeater is fixed for checking, while candidate bidirectional port pairs of optical switch 100 are scanned to find one which is in a connecting relation with the bidirectional optical signal repeater. Conversely, in this embodiment, a bidirectional port pair of optical switch 100 is fixed, while candidate bidirectional optical signal repeaters are scanned to find one which is in a connecting relation with the bidirectional port pair of optical switch 100.

As the routine is started (step 501), controller 160 first specifies a bidirectional port pair "i" of optical switch 100 for which a check is made as to which of bidirectional optical signal repeaters the bidirectional port pair is connected (step 502). Assume herein that the bidirectional port pair "i" is comprised of ports 101, 102 in FIG. 2, and the following description will be made in this scenario.

Controller 160 sets the bidirectional pair "i" of optical switch 100 into the loop back state through controller 109 (step 503). The state is illustrated, for example, in FIG. 4. Then, a variable "m" is used to represent a number given to a bidirectional optical signal repeater which can be connected to the bidirectional port pair "i". when there are "M" candidates, "m" is a natural number, and corresponds a bidirectional optical signal repeater to any of "1 to M". By varying the value of "m", controller 160 can confirm the connectivity of the bidirectional port pair "i" of optical switch 100 with all candidate bidirectional optical signal repeaters which can be connected to the bidirectional port pair "i".

First, "m" is set to one (m=1) (step 504). Here, m=1 corresponds to the bidirectional optical signal repeater 120. A value representative of an identifier is set to the J0 byte by regenerator 121 in bidirectional optical signal repeater 120 (step 505). Next, controller 160 detects an identifier from an optical signal applied to reception port 108 of the bidirectional optical signal repeater "m" (bidirectional optical signal repeater 120) through regenerator 122 and controller 125 (step 506), and checks whether or not a transmitted identifier is the same as the received identifier (step 507).

When controller 160 confirms at step 507 that the transmitted identifier is the same as the received identifier, the routine is terminated on the assumption that the bidirectional port pair i of optical switch 100 is connected to the bidirectional optical signal repeater "m" corresponding to the current value of "m" (step 509).

When a bidirectional port pair comprised of ports 101, 102 are in the loop back state as illustrated in FIG. 4, an optical signal having an identifier added thereto in regenerator 121 of bidirectional optical signal repeater 120 will not return to bidirectional optical signal repeater 120. In the state illustrated in FIG. 4, regenerator 122 is applied with an optical signal received at port 142 of optical switch 100. In other words, controller 160 confirms at step 507 that the identifier added to the signal by regenerator 121 does not match the identifier of the signal received by regenerator 122, and knows that the bidirectional port pair comprised of ports 101, 102 of optical switch 100 are not connected to the bidirectional optical signal repeater corresponding to m=1 (bidirectional optical signal repeater 120).

Thus, in response to the confirmation at step 507 that the transmitted identifier does not match the received identifier, controller 160 checks the connectivity with another bidirectional optical signal repeater by incrementing the value of "m" (step 508), confirming that m=M+1 will not happen (step 510), and returning to step 505. In this way, controller 160 starts a check as to whether or not the bidirectional optical signal repeater corresponding to m=2 is connected to the bidirectional port pair comprised of ports 101, 102 of optical switch 100.

If m=M+1 is confirmed at step 510, controller 160 performs error-related processing (step 511), followed by termination of the routine.

As the foregoing routine is repeated, an identifier is added to a signal transmitted to optical switch 100 in certain bidirectional optical signal repeater "m", and a check on a signal received by the bidirectional optical signal repeater "m" may result in detection of the same identifier as that added to the transmitted signal (when Yes at step 507). This can be seen when an identifier has been given to a signal sent to optical switch 100 by regenerator 111 of bidirectional optical signal repeater 110, and this signal is looped back to bidirectional optical signal repeater 110 as it is by optical switch 100, as illustrated in FIG. 4. In this event, since the identifier of the optical signal received from optical switch 100 matches the identifier added to transmitted signal, controller 160 knows that the bidirectional port pair comprised of ports 101, 102, which have been set in the loop back state in optical switch 100, is connected to bidirectional optical signal repeater 110. This is because when certain optical switch is in the loop back state, a signal itself sent from a bidirectional optical signal repeater returns to an input port of the same bidirectional optical signal repeater only when a bidirectional port pair of the bidirectional optical signal repeater is connected to a bidirectional port pair of the optical switch.

When no solution can be found even after the bidirectional port pair has been checked for all bidirectional optical signal repeaters "m" (when Yes at step 510), an error occurs (step 511), causing controller 160 to check other possible faults.

Next, the third embodiment of the present invention will be described with reference to the flow chart of FIG. 7 which illustrates a routine according to this embodiment.

Figure 7:
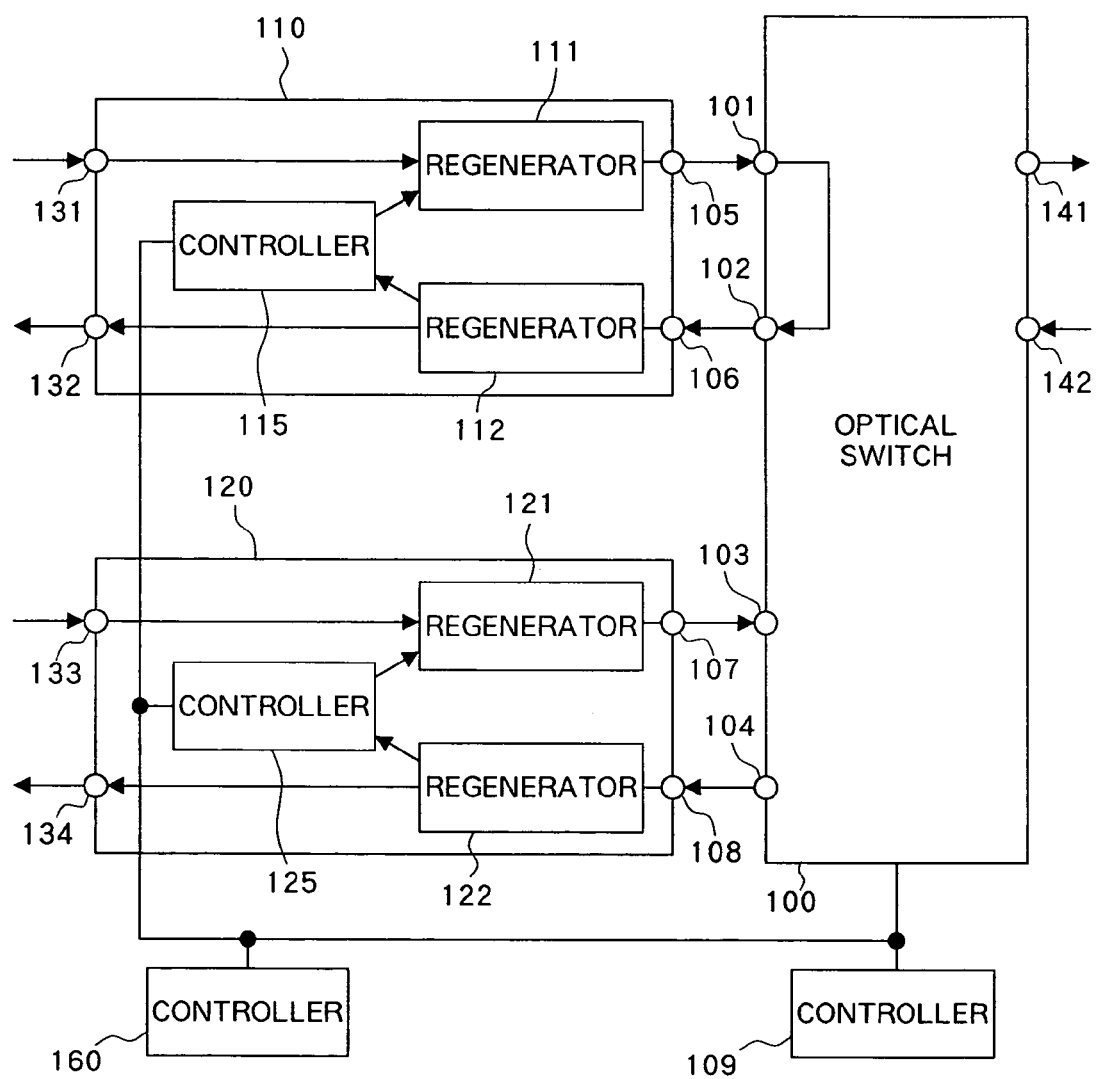
FIG. 7 is a block diagram illustrating the configuration of the communication system according to the third embodiment of the present invention.

FIG. 7 is identical in configuration to FIG. 2, only except for the connecting state of optical switch 100. Regenerators 101, 112 are 3R regenerative repeaters of SONET, where a B1 byte contains the result of parity operation in the transmission format, permitting odd-numbered bit errors, if any, to be detected. A bit error ratio can be calculated by detecting such bit errors over a certain period (see Bellcore document cited above in Description of Related Art). Consequently, the SONET regenerator has a means for adding information for evaluating the transmission quality after reception, and a means for calculating the transmission quality after reception while utilizing the information.

Assume now that management is desired on an optical link between port 105 and port 101 and an optical link between port 102 and port 106. In this event, as illustrated in FIG. 7, regenerator 112 can calculate a bit error ratio of optical signals applied to port 106 of bidirectional signal repeater 110, assuming that a bidirectional port pair comprised of ports 101, 102 of optical switch 100 is in the loop back state. The normality of the optical links can be confirmed by ascertaining that the calculated bit error ratio is equal to or lower than a predetermined bit error ratio which is defined as normal (for example, equal to or lower than $10^{-9}$).

Controller 160 is responsible for controlling the overall system, controller 109 is responsible for controlling loop back switching, and controller 115 is responsible for calculating the bit error ratio. In the foregoing manner, the normality can be confirmed on the links between the bidirectional optical signal repeater and optical switch.

Figure 10:
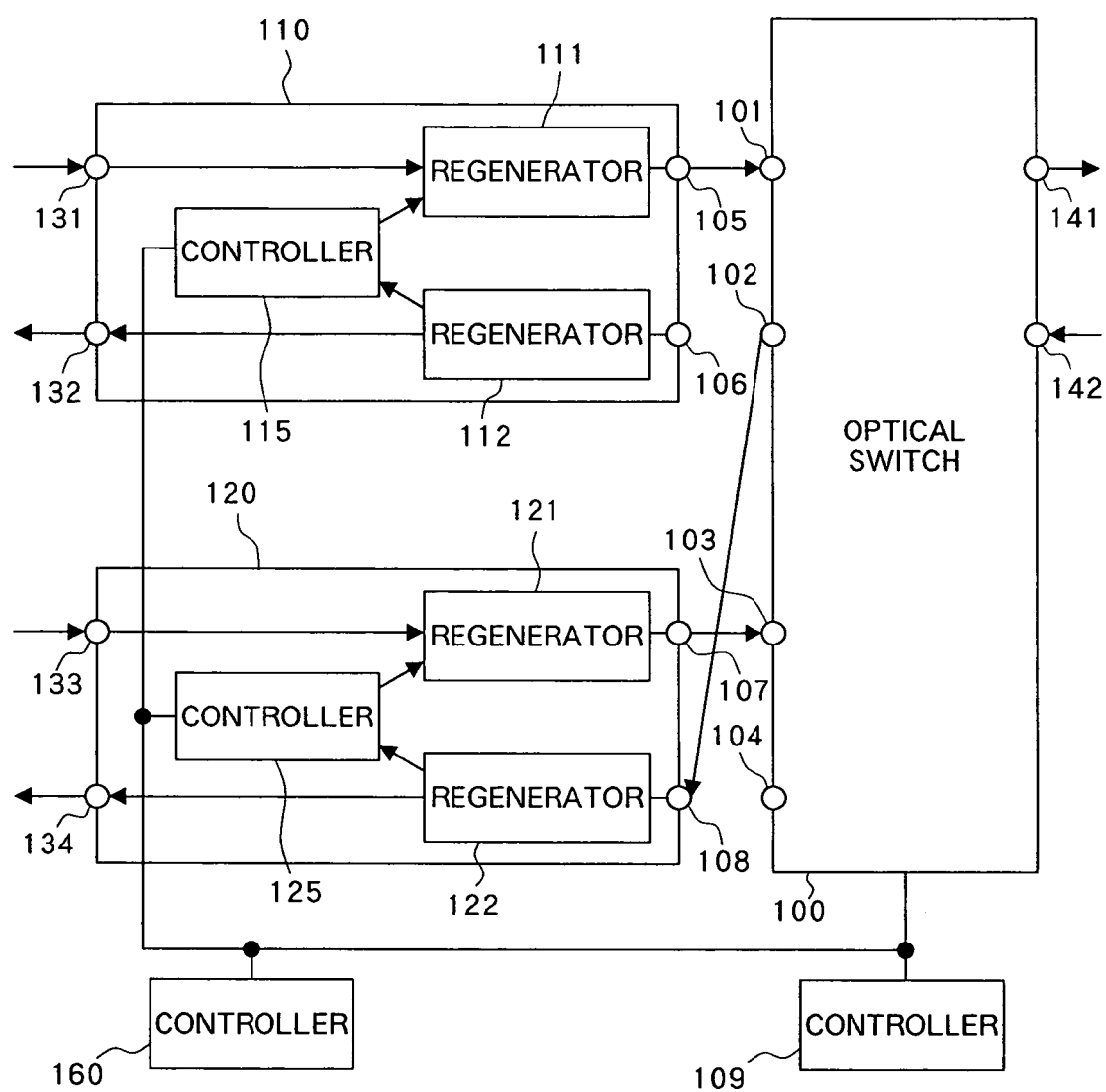
FIG. 10 is a block diagram illustrating the configuration of the communication system for describing the method of detecting a connecting state according to the fourth and fifth embodiments of the present invention.

Next, a fourth embodiment of the present invention will be described with reference to FIGS. 8 and 10.

Figure 8:
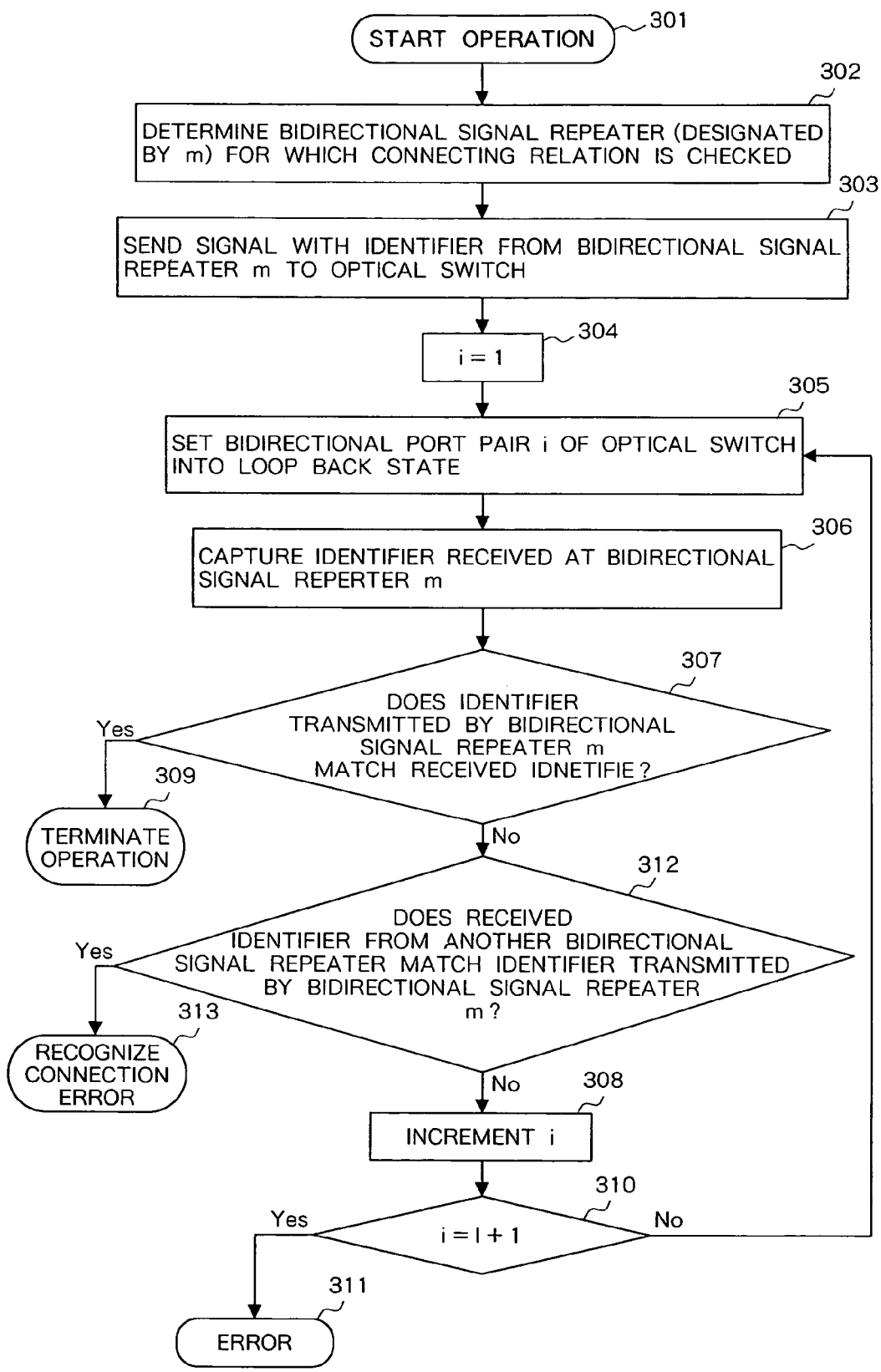
FIG. 8 is a flow chart illustrating the method for detecting a connecting state according to the fourth embodiment of the present invention.

FIG. 8 is a flow chart illustrating a routine according to the fourth embodiment of the present invention. The flow chart of the fourth embodiment is identical to the flow chart of FIG. 5 illustrating the routine according to the first embodiment except for additional steps 312 and 313 as can be seen in FIG. 8.

Upon confirming at step 307 that an identifier added to a transmitted signal by a bidirectional signal repeater is different from an identifier extracted from a received signal (Yes at step 307), controller 160 checks identifiers received by other bidirectional signal repeaters to attempt to find reception of a signal which has the same identifier as an identifier added by a bidirectional signal repeater "m" for which a connecting relation is checked (step 312).

When it is confirmed at step 312 that another bidirectional signal repeater has received a signal having the same identifier as the identifier added by the bidirectional signal repeater "m", controller 160 knows that the connecting state is erroneous. For example, as illustrated in FIG. 10, no bidirectional port pair of optical switch 100 is connected to any bidirectional port pair of any optical signal repeater, whereas port 102 is connected to port 108. In this connecting state, if an identifier is added to a signal in regenerator 111, the signal having the identifier is received by regenerator 122. This results in a failure in making up a bidirectional signal repeater, as illustrated in FIG. 10. By confirming identifiers of signals received by other regenerators, controller 160 can recognize how erroneous connections have been made between ports.

Next, a fifth embodiment of the present invention will be described with reference to FIGS. 9 and 10.

Figure 9:
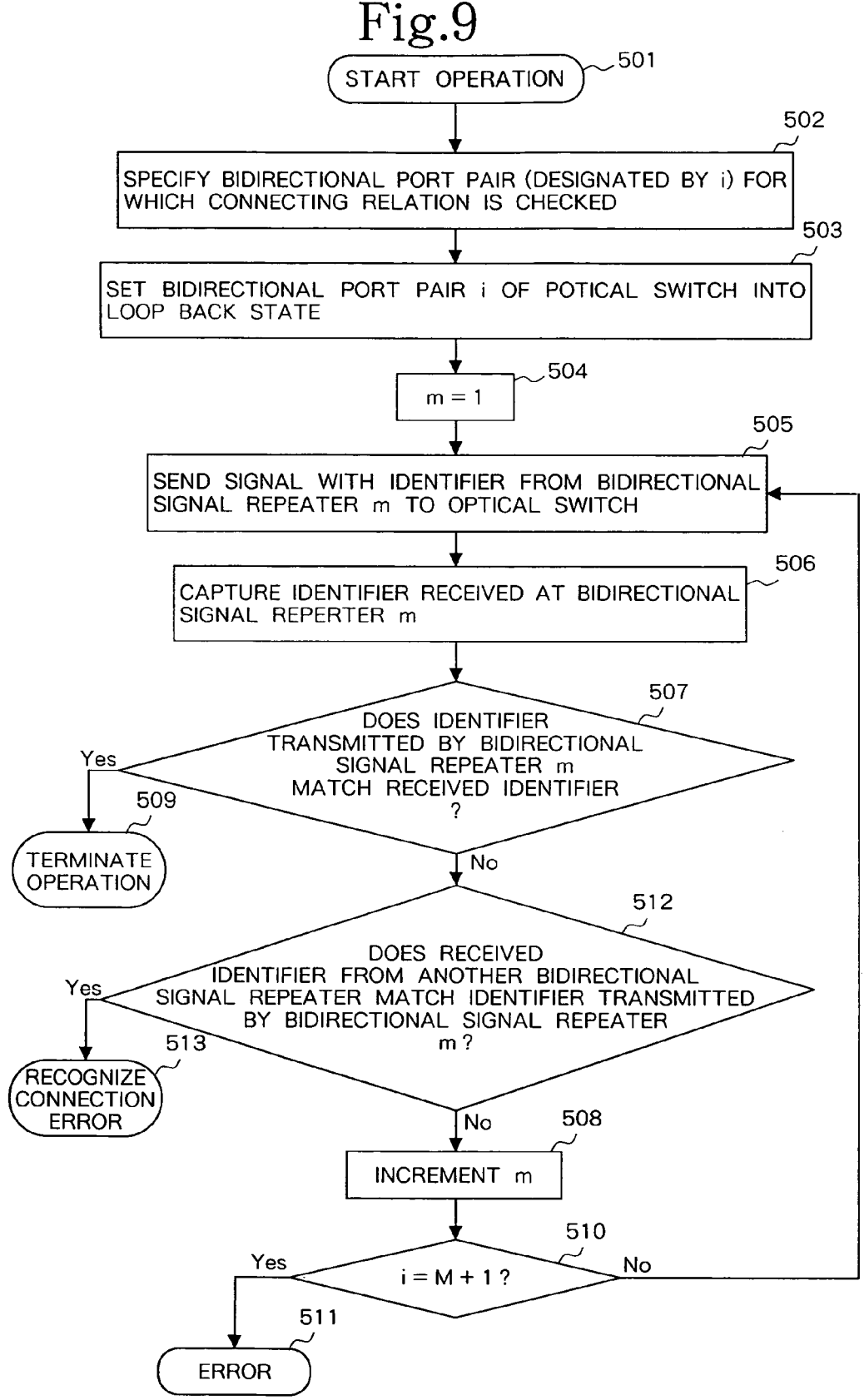
FIG. 9 is a flow chart illustrating the method for detecting a connecting state according to the fifth embodiment of the present invention.

FIG. 9 is a flow chart illustrating a routine according to the fifth embodiment of the present invention. The flow chart of the fifth embodiment is identical to the flow chart of FIG. 6 illustrating the routine according to the second embodiment except for additional steps 512 and 513 as can be seen in FIG. 9.

Upon confirming at step 507 that an identifier added to a transmitted signal by a bidirectional signal repeater is different from an identifier of a received signal (Yes at step 507), controller 160 checks identifiers of signals received by other bidirectional signal repeaters to attempt to find reception of a signal which has the same identifier as an identifier added by a bidirectional signal repeater "m" for which a connecting relation is checked (step 512).

When it is confirmed at step 512 that another bidirectional signal repeater has received a signal having the same identifier as the identifier added by the bidirectional signal repeater "m", controller 160 knows that the connecting state is erroneous. For example, as illustrated in FIG. 10, no bidirectional port pair of optical switch 100 is connected to any bidirectional port pair of any optical signal repeater, whereas port 102 is connected to port 108. In this connecting state, if an identifier is added to a signal in regenerator 111, the signal having the identifier is received by regenerator 122. This results in a failure in making up a bidirectional signal repeater, as illustrated in FIG. 10. By confirming identifiers of signals received by other regenerators, controller 160 can recognize how erroneous connections have been made between ports.

As described above, with the use of the configuration and method according to the present invention of comparing identifiers, confirmation can be made as to which bidirectional port pair of the optical switch is connected to which bidirectional port pair of the bidirectional optical signal repeater without relying on visual confirmation on cable connections. It is therefore possible to prevent an erroneous registration due to a human error when the topology is registered in a network management system. Also, for recovering a network from a fault using an optical cross-connect system, a main route can be switched to a spare route after confirming the normality of a spare link between a bidirectional optical signal repeater and an optical switch. It is therefore possible to obviate meaningless switching for recovery from a fault, such as switching to the spare link between the bidirectional optical signal repeater and optical switch in spite of a fault occurring on the spare link, thus resulting in an efficient network operation.

When regenerators 111, 112, 121, 122 used herein have the ability to deliver a signal, to which an identifier is added thereby, even if no signal is applied thereto, it is possible to find which bidirectional optical signal repeater is connected to which bidirectional port pair of optical switch 100 even if any optical signal is not being transmitted on a transmission path between port 131 and regenerator 111, and therefore confirm the normality of the link between the bidirectional optical signal repeater and optical switch.

While the foregoing embodiments have been described in connection with a system in which bidirectional optical signal repeater 120 does not deliver a multiplexed optical signal onto a transmission path (toward optical switch 100), it should be obvious that the present invention can be applied as well when bidirectional optical signal repeaters 110, 120 deliver respective optical signals at different wavelengths which are multiplexed for transmission onto the transmission path. In this event, wavelength multiplexing may be used.

At step 313 in FIG. 8 and step 513 in FIG. 9, controller 160 concludes an erroneous connection on the assumption that there is no error in the setting of the optical switch into the loop back state. However, if it cannot be said that the optical switch is correctly controlled, it is obvious that there can be an error in the setting of the loop back itself.

With the use of the configuration and method according to the present invention described above, confirmation can be made as to which bidirectional port pair of the optical switch is connected to which bidirectional port pair of the bidirectional optical signal repeater without relying on visual confirmation on cable connections. It is therefore possible to prevent an erroneous registration due to a human error when the topology is registered in a network management system. Also, for recovering a network from a fault using an optical switch, a main route can be switched to a spare route after confirming the normality of a spare link between a bidirectional optical signal repeater and an optical switch. It is therefore possible to obviate meaningless switching for recovery from a fault, such as switching to the spare link between the bidirectional optical signal repeater and optical switch in spite of a fault occurring on the spare link, thus resulting in an efficient network operation.

What is claimed is:

1. A communication system comprising:
   a switching device having a plurality of bidirectional port pairs, each of which is a combination of an input port and an output port, said switching device being capable of entering a loop back state for delivering a signal applied to an input port to an output port which forms said bidirectional port pair together with said input port;
a plurality of signal repeaters each having an input port and an output port for connection to an input port or an output port which forms part of one of said bidirectional port pairs; and
a controller for controlling said switching device and said signal repeaters,
wherein each said signal repeater includes:
transmitting means for transmitting a signal from its output port to said switching device after said signal repeater has added an identifier to the signal; and
receiving means for receiving a signal from said switching device at its reception port to detect an identifier included in the signal, and
said controller sets one of said bidirectional port pairs included in said switching device into a loop back state, and checks whether the identifier added to the signal transmitted from said transmitting means matches the identifier included in the signal received by said receiving means to detect a connecting relation between the output port and input port of said signal repeater and the output port and input port which forms said bidirectional port pair.

2. The communication system according to claim 1, wherein:
said switching device is an optical switch, and said signal is an optical signal.

3. In a communication system comprising a switching device having a plurality of bidirectional port pairs, each of which is a combination of an input port and an output port, said switching device being capable of entering a loop back state for delivering a signal applied to an input port to an output port which forms said bidirectional port pair together with said input port, and a plurality of signal repeaters each having an input port and an output port for connection to an input port or an output port which forms part of said bidirectional port pair, a method of detecting a connecting relation between a signal repeater and said switching device, said method comprising:
a first step of adding an identifier to a signal in one of said signal repeaters and transmitting the signal to said switching device;
a second step of setting one of said bidirectional port pairs included in said switching device into a loop back state; and
a third step of detecting an identifier received in said signal repeater, confirming whether or not said received identifier matches the identifier added to the signal transmitted at said first step, when confirming the matching of said identifiers, determining that the input port and output port of said signal repeater for which said matching has been confirmed are connected to the output port and input port of said bidirectional port pair set into the loop back state, and when not confirming the matching of said identifiers, setting a different bidirectional port pair into the loop back state at said second step to repeat a similar operation.

4. In a communication system comprising a switching device having a plurality of bidirectional port pairs, each of which is a combination of an input port and an output port, said switching device being capable of entering a loop back state for delivering a signal applied to an input port to an output port which forms said bidirectional port pair together with said input port, and a plurality of signal repeaters each having an input port and an output port for connection to an input port or an output port which forms part of said bidirectional port pair, a method of detecting a connecting relation between a signal repeater and said switching device, said method comprising:
a first step of adding an identifier to a signal in one of said signal repeaters and transmitting the signal to said switching device;
a second step of setting one of said bidirectional port pairs included in said switching device into a loop back state; and
a third step of detecting an identifier received in said signal repeater, confirming whether or not said received identifier matches the identifier added to the signal transmitted at said first step, when confirming the matching of said identifiers, determining that the input port and output port of said signal repeater for which said matching has been confirmed are connected to the output port and input port of said bidirectional port pair set into the loop back state, and when not confirming the matching of said identifiers, adding an identifier to a signal in a different one of said signal repeaters at said first step to repeat a similar operation.

5. A communication system comprising:
a switching device having a plurality of bidirectional port pairs, each of which is a combination of an input port and an output port, said switching device being capable of entering a loop back state for delivering a signal applied to an output port which forms said bidirectional port pair together with said input port;
a plurality of signal repeaters each having an input port and an output port for connection to an input port or an output port which forms part of said bidirectional port pair; and
a controller for controlling said switching device and said signal repeaters,
wherein each said signal repeater includes:
transmitting means for transmitting a signal from its output port to said switching device after said signal repeater has added information for measuring a signal quality; and
reception quality measuring means for measuring the quality of the received signal with the signal looped back from said switching means and having the information for measuring the signal quality added thereto; and
said controller sets one of said bidirectional port pairs included in said switching device into a loop back state, and forces said transmitting means and said reception quality measuring means to measure the quality of the received signal.

6. The communication system according to claim 5, wherein:
said controller relies on the quality of the received signal to confirm normality in a connecting relation between
the output port and input port of said signal repeater and the output port and input port which form said bidirectional port pair.

7. In a communication system comprising a switching device having a plurality of bidirectional port pairs, each of which is a combination of an input port and an output port, said switching device being capable of entering a loop back state for delivering a signal applied to an input port to an output port which forms said bidirectional port pair together with said input port, and a plurality of signal repeaters each having an input port and an output port for connection to an input port or an output port which forms part of said bidirectional port pair, a method of detecting a connecting relation between a signal repeater and said switching device, said method comprising:

a first step of adding an identifier to a signal in one of said signal repeaters and transmitting the signal to said switching device;

a second step of setting one of said bidirectional port pairs included in said switching device into a loop back state;

a third step of detecting an identifier received in said signal repeater, confirming whether or not said received identifier matches the identifier added to the signal transmitted at said first step, and when confirming the matching of said identifiers, determining that the input port and output port of said signal repeater for which said matching has been confirmed are connected to the output port and input port of said bidirectional port pair set into the loop back state; and a fourth step, executed when not confirming the matching of said identifiers, for confirming whether or not an identifier has been received by a signal repeater other than said signal repeater which has transmitted the identifier at said first step, recognizing that there is an error in a connection between said signal repeater and said switching device when confirming that an identifier has been received by a signal repeater other than said signal repeater which has transmitted the identifier, and setting a different bidirectional port pair into the loop back state at said second step to repeat a similar operation when confirming that no identifier has been received by a signal repeater other than said signal repeater which has transmitted the identifier.

8. In a communication system comprising a switching device having a plurality of bidirectional port pairs, each of which is a combination of an input port and an output port, said switching device being capable of entering a loop back state for delivering a signal applied to an input port to an output port which forms said bidirectional port pair together with said input port, and a plurality of signal repeaters each having an input port and an output port for connection to an input port or an output port which forms part of said bidirectional port pair, a method of detecting a connecting relation between a signal repeater and said switching device, said method comprising:

a first step of adding an identifier to a signal in one of said signal repeaters and transmitting the signal to said switching device;

a second step of setting one of said bidirectional port pairs included in said switching device into a loop back state;

a third step of detecting an identifier received in said signal repeater, confirming whether or not said received identifier matches the identifier added to the signal transmitted at said first step, and when confirming the matching of said identifiers, determining that the input port and output port of said signal repeater for which said matching has been confirmed are connected to the output port and input port of said bidirectional port pair set into the loop back state; and a fourth step, executed when not confirming the matching of said identifiers, for confirming whether or not an identifier has been received by a signal repeater other than said signal repeater which has transmitted the identifier at said first step, recognizing that there is an error in a connection between said signal repeater and said switching device when confirming that an identifier has been received by a signal repeater other than said signal repeater which has transmitted the identifier, and adding an identifier to a signal in a different one of said signal repeaters at said first step to repeat a similar operation when confirming that no identifier has been received by a signal repeater other than said signal repeater which has transmitted the identifier.

9. A switching device comprising:

a plurality of bidirectional port pairs, each of which is a combination of an input port and an output port, and controller which set sets a loop back state in reply to a switching request form external, for delivering a signal applied to an input port to an output port which forms said bidirectional port pair together with said input port, and a signal repeater used with said switching, comprising:
an input port and an output port for connection to an input port or an output port of said switching device which forms part of one of bidirectional port pairs;
transmitting means for transmitting a signal from its output port to said switching device after said signal repeater has added an identifier to the signal;
receiving means for receiving a signal from said switching device at its reception port to detect an identifier included in the signal;
controller which send switching request to the controller of said switching device for sets one of said bidirectional port pairs included in said switching device into a loop back state, and checks whether the identifier added to the signal transmitted from said transmitting means matches the identifier included in the signal received by said receiving means to detect a connecting relation between the output port and input port of said signal repeater and the output port and input port which forms said bidirectional port pair.

10. A switching device comprising:

a plurality of bidirectional port pairs, each of which is a combination of an input port and an output port, and controller which set sets a loop back state in reply to a switching request form external, for delivering a signal applied to an input port to an output port which forms said bidirectional port pair together with said input port, and a signal repeater used with said switching, comprising:
an input port and an output port for connection to an input port or an output port of said switching device which forms part of said bidirectional port pair;
transmitting means for transmitting a signal from its output port to said switching device after said signal repeater has added information for measuring a signal quality;
reception quality measuring means for measuring the quality of the received signal with the signal looped back from said switching means and having the information for measuring the signal quality added thereto; and
controller which send switching request to the controller of said switching device for sets the said bidirectional port pairs included in said switching device and connected to an input port and an output port of itself into a loop back state, and forces said transmitting means and said reception quality measuring means to measure the quality of the received signal.

* * * * *

UNITED STATES PATENT AND TRADEMARK OFFICE
CERTIFICATE OF CORRECTION

PATENT NO. : 7,515,545 B2
APPLICATION NO. : 10/869078
DATED : April 7, 2009
INVENTOR(S) : Tatsuya Shiragaki Page 1 of 1

It is certified that error appears in the above-identified patent and that said Letters Patent is hereby corrected as shown below:

Col. 18, line 16; after "switching", insert -- device --

Signed and Sealed this
Tenth Day of May, 2011

David J. Kappos
*Director of the United States Patent and Trademark Office*